(12) United States Patent
Tanemura

(10) Patent No.: US 10,019,122 B2
(45) Date of Patent: Jul. 10, 2018

(54) CAPACITIVE SENSING USING NON-INTEGER EXCITATION

(71) Applicant: Synaptics Incorporated, San Jose, CA (US)

(72) Inventor: Tetsuo Tanemura, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 30 days.

(21) Appl. No.: 15/087,615

(22) Filed: Mar. 31, 2016

(65) Prior Publication Data

US 2017/0285795 A1    Oct. 5, 2017

(51) Int. Cl.
G06F 3/044 (2006.01)
G06F 3/041 (2006.01)

(52) U.S. Cl.
CPC ............ *G06F 3/044* (2013.01); *G06F 3/0412* (2013.01)

(58) Field of Classification Search
CPC .................. G06F 3/044; G06F 3/0412; G06F 2203/04101; G06F 2203/04106; G01R 27/26
See application file for complete search history.

(56) References Cited

U.S. PATENT DOCUMENTS

| 4,170,025 A | 10/1979 | Benkley et al. |
| 4,459,541 A | 7/1984 | Fielden et al. |
| 4,733,222 A | 3/1988 | Evans |
| 4,974,236 A | 11/1990 | Gurcan et al. |
| 5,304,937 A | 4/1994 | Meyer |
| 5,305,017 A | 4/1994 | Gerpheide |
| 5,648,642 A | 7/1997 | Miller et al. |
| 5,666,113 A | 9/1997 | Logan |
| 5,787,126 A | 7/1998 | Itoh et al. |
| 5,790,106 A | 8/1998 | Hirano et al. |
| 5,825,352 A | 10/1998 | Bisset et al. |

(Continued)

FOREIGN PATENT DOCUMENTS

| EP | 0749086 A1 | 12/1996 |
| EP | 1624399 A1 | 2/2006 |

(Continued)

OTHER PUBLICATIONS

Cichocki, et al.; "A Switched-Capacitor Interface for Capacitive Sensors Based on Relaxation Oscillators"; IEEE Journal, Oct. 1990; pp. 797-799; vol. 39, No. 5 ( pages).

(Continued)

*Primary Examiner* — Jennifer Mehmood
*Assistant Examiner* — Sardis F Azongha
(74) *Attorney, Agent, or Firm* — FBFK PC

(57) ABSTRACT

Capacitive sensing includes concurrently driving a first transmitter electrode with a first transmitter signal and a second transmitter electrode with a second transmitter signal. The first transmitter signal is based on a first digital code and the second transmitter signal is based on a second digital code. The first digital code and the second digital code each include at least one non-integer multiple. Capacitive sensing further includes receiving resulting signals using multiple receiver electrodes, the resulting signals include effects of the first transmitter signal and the second transmitter signal. Capacitive sensing further includes determining positional information based on the resulting signals.

18 Claims, 5 Drawing Sheets

(56) References Cited

U.S. PATENT DOCUMENTS

| | | | |
|---|---|---|---|
| 5,841,078 A | 11/1998 | Miller et al. |
| 5,861,875 A | 1/1999 | Gerpheide |
| 5,880,411 A | 3/1999 | Gillespie et al. |
| 5,889,236 A | 3/1999 | Gillespie et al. |
| 5,917,906 A | 6/1999 | Thornton |
| 5,924,708 A | 7/1999 | Bisaillon et al. |
| 5,940,526 A | 8/1999 | Setlak et al. |
| 5,963,679 A | 10/1999 | Setlak |
| 6,067,368 A | 5/2000 | Setlak et al. |
| 6,259,804 B1 | 7/2001 | Setlak et al. |
| 6,392,167 B1 | 5/2002 | Nakagawa |
| 6,570,557 B1 | 5/2003 | Westerman et al. |
| 6,621,487 B2 | 9/2003 | Iwasaki et al. |
| 6,704,005 B2 | 3/2004 | Kato et al. |
| 6,771,280 B2 | 8/2004 | Fujisaki et al. |
| 6,788,288 B2 | 9/2004 | Ano |
| 7,075,316 B2 | 7/2006 | Umeda et al. |
| 7,078,918 B2 | 7/2006 | Umeda et al. |
| 7,084,645 B1 | 8/2006 | Umeda et al. |
| 7,106,720 B2 | 9/2006 | Ozluturk et al. |
| 7,292,229 B2 | 11/2007 | Morag et al. |
| 7,333,089 B1 | 2/2008 | Gard |
| 7,372,455 B2 | 5/2008 | Perski et al. |
| 7,451,050 B2 | 11/2008 | Hargreaves |
| 7,616,786 B2 | 11/2009 | Setlak |
| 7,643,010 B2 | 1/2010 | Westerman et al. |
| 7,812,827 B2 | 10/2010 | Hotelling et al. |
| 7,868,874 B2 | 1/2011 | Reynolds |
| 7,920,134 B2 | 4/2011 | Krah |
| 8,338,724 B2 | 12/2012 | Reynolds |
| 8,558,811 B2 | 10/2013 | Reynolds |
| 8,809,702 B2* | 8/2014 | Reynolds | G06F 3/041 178/18.06 |
| 8,970,544 B1* | 3/2015 | Mohindra | G06F 3/0416 345/173 |
| 9,063,608 B2* | 6/2015 | Roberson | G06F 3/0416 |
| 2002/0049070 A1 | 4/2002 | Bick |
| 2002/0050983 A1 | 5/2002 | Liu et al. |
| 2002/0173337 A1 | 11/2002 | Hajimiri et al. |
| 2002/0185981 A1 | 12/2002 | Dietz et al. |
| 2003/0030628 A1 | 2/2003 | Sato et al. |
| 2003/0035570 A1 | 2/2003 | Benkley |
| 2003/0067449 A1 | 4/2003 | Yoshikawa et al. |
| 2003/0076306 A1 | 4/2003 | Zadesky et al. |
| 2003/0133432 A1 | 7/2003 | Moerder |
| 2004/0056785 A1 | 3/2004 | Webster et al. |
| 2004/0056849 A1 | 3/2004 | Lohbihler et al. |
| 2004/0081339 A1 | 4/2004 | Benkley |
| 2005/0005703 A1 | 1/2005 | Saito et al. |
| 2005/0024065 A1 | 2/2005 | Umeda et al. |
| 2005/0052425 A1 | 3/2005 | Zadesky et al. |
| 2005/0073324 A1 | 4/2005 | Umeda et al. |
| 2005/0122785 A1 | 6/2005 | Umeda et al. |
| 2005/0150697 A1 | 7/2005 | Altman et al. |
| 2006/0111074 A1 | 5/2006 | Petilli et al. |
| 2006/0293017 A1 | 12/2006 | Kim et al. |
| 2007/0047669 A1 | 3/2007 | Mak et al. |
| 2007/0062852 A1 | 3/2007 | Zachut et al. |
| 2007/0109274 A1 | 5/2007 | Reynolds |
| 2007/0296709 A1 | 12/2007 | GuangHai |
| 2008/0158167 A1 | 7/2008 | Hotelling et al. |
| 2008/0158182 A1 | 7/2008 | Westerman |
| 2008/0192018 A1 | 8/2008 | Park et al. |
| 2009/0019949 A1 | 1/2009 | Rothkopf et al. |
| 2009/0135973 A1 | 5/2009 | He |
| 2009/0143031 A1 | 6/2009 | Shah |
| 2009/0189867 A1 | 7/2009 | Krah et al. |
| 2009/0225036 A1 | 9/2009 | Wright |
| 2009/0273579 A1 | 11/2009 | Zachut et al. |
| 2009/0322351 A1 | 12/2009 | McLeod |
| 2009/0322578 A1 | 12/2009 | Petrovic |
| 2010/0059295 A1 | 3/2010 | Hotelling et al. |
| 2010/0060589 A1 | 3/2010 | Wilson |
| 2010/0060591 A1 | 3/2010 | Yousefpor et al. |
| 2010/0079083 A1 | 4/2010 | Seguine |
| 2010/0110037 A1 | 5/2010 | Huang et al. |
| 2010/0159858 A1 | 6/2010 | Dent et al. |
| 2010/0189197 A1 | 7/2010 | Nakatani |
| 2010/0321331 A1 | 12/2010 | Oda et al. |
| 2011/0037724 A1 | 2/2011 | Paulsen et al. |
| 2011/0042153 A1 | 2/2011 | Wu et al. |
| 2011/0063993 A1 | 3/2011 | Wilson et al. |
| 2011/0084857 A1 | 4/2011 | Marino et al. |
| 2012/0013546 A1 | 1/2012 | Westhues et al. |
| 2012/0056841 A1 | 3/2012 | Krenik et al. |
| 2012/0068949 A1 | 3/2012 | Washburn et al. |
| 2012/0068966 A1 | 3/2012 | Washburn et al. |
| 2012/0182259 A1 | 7/2012 | Han |
| 2014/0035601 A1 | 2/2014 | Fujiyoshi |
| 2014/0098032 A1 | 4/2014 | Ng et al. |
| 2014/0192007 A1 | 7/2014 | Westhues et al. |

FOREIGN PATENT DOCUMENTS

| | | |
|---|---|---|
| JP | 2003022158 A | 1/2003 |
| JP | 2005098789 A | 4/2005 |
| JP | 2005114362 A | 4/2005 |
| KR | 20080075611 A | 8/2008 |
| KR | 20100042761 A | 4/2010 |
| WO | 0247018 A2 | 6/2002 |
| WO | 2004107146 A2 | 12/2004 |

OTHER PUBLICATIONS

Huang, et al.; "Electronic Transducers for Industrial Measurement of Low Value Capacitances"; J. Phys. E: Sci Instrum. 21, 1988 IOP Publishing Ltd., pp. 242-250 (9 pages).

Philipp, Hal; "Charge Transfer Sensing", 1997 pp. 1-9 (9 pages).

Smith, et al. "Code-Division Multiplexing of a Sensor Channel: A software Imprementation"; IEEE Journal, Apr. 1999, vol. 17, No. 4, pp. 725-731 (7 pages).

Smith, et al.; "Electric Field Sensing for Graphical Interfaces"; IEEE Computer Graphics and Applications; May/Jun. 1998, pp. 54-60 (7 pages).

Vigoda, Benjamin; "A Nonlinear Dynamic System for Spread Spectrum Code Acquisition"; Aug. 9, 1999, MIT Media Laboratory pp. 10-90 (82 pages).

West, J.D.K.; "The Application of the Asymmetric Polyphase Filter in an SSB Transceiver"; Grinel Natal Branch of Grinaker Electronics, IEEE 1991 (8 pages).

Yam, Y.-O. et al.; "Innovative Demodulation Method for SSB Technique", IEEE Proc. Circuits Devices Syst., vol. 146, No. 3, Jun. 1999 (5 pages).

Yamada, M. et al.; A Switched-Capacitor Interface for Capacitive Pressure Sensors; IEEE Transactions on Instrumentation and Measurement, vol. 41, No. 1, Feb. 1992, pp. 81-86 (6 pages).

Zimmerman, T.G. et al.; "Applying Electric Field Sensing to Human-Computer Interfaces"; MIT Media Laboratory, pp. 1-8 (8 pages).

Notice of Reasons for Rejection in related Japanese Patent Application No. P2008-541174 dated Feb. 29, 2012.

Notice of Reasons for Rejection in related Japanese Patent Application No. P2008-541174 dated Feb. 19, 2013 (4 pages).

Decision to Grant Patent in related Japanese Patent Application No. 2008-541174 dated Aug. 6, 2013 (3 pages).

Notice of Allowance in related Japanese Patent Application No. 2013-100309 dated Feb. 25, 2014 (3 pages).

Office Action in related European Patent Application No. 06816952.3 dated Dec. 11, 2009 (3 pages).

Office Action in related Chinese Patent Application No. 200680042701.5 dated Sep. 4, 2009 (16 pages).

Office Action in related Chinese Patent Application No. 200680042701.5 dated Jun. 28, 2010 (18 pages).

Office Action in related Chinese Patent Application No. 200680042701.5 dated Nov. 23, 2010 (11 pages).

Office Action in related Chinese Patent Application No. 200680042701.5 dated May 25, 2011 (7 pages).

Office Action in related Chinese Patent Application No. 200680042701.5 dated Sep. 14, 2011 (10 pages).

(56) References Cited

OTHER PUBLICATIONS

Notification to Grant Patent Right for Invention in related Chinese Patent Application No. 200680042701.5 dated Mar. 8, 2012 (4 pages).
Office Action in related U.S. Appl. No. 11/274,999 dated Jan. 28, 2009 (29 pages).
Final Office Action in related U.S. Appl. No. 11/274,999 dated Jul. 16, 2009 (25 pages).
Office Action in related U.S. Appl. No. 11/274,999 dated Jan. 5, 2010 (27 pages).
Final Office Action in related U.S. Appl. No. 11/274,999 dated Jul. 13, 2010 (32 pages).
Notice of Allowance in related U.S. Appl. No. 11/274,999 dated Sep. 3, 2010 (6 pages).
Notice of Allowance in related U.S. Appl. No. 12/962,096 dated Aug. 20, 2012 (5 pages).
Notice of Allowance in related U.S. Appl. No. 13/679,355 dated Jun. 11, 2013 (8 pages).
Notice of Allowance in related U.S. Appl. No. 12/962,110 dated Jul. 16, 2012 (19 pages).
Office Action in related U.S. Appl. No. 13/233,790 dated Aug. 15, 2013 (33 pages).
Office Action in related U.S. Appl. No. 13/233,781 dated Jul. 18, 2013 (58 pages).
Notice of Allowance in related U.S. Appl. No. 14/177,566 dated Apr. 2, 2014 (10 pages).
International Search Report in related International Application No. PCT/US2006/040266 dated Mar. 30, 2007 (3 pages).
International Preliminary Report on Patentability issued in related International Application No. PCT/US2006/040266 dated May 20, 2008 (7 pages).
International Preliminary Report on Patentability issued in related International Application No. PCT/US2011/051998 dated Mar. 19, 2013 (5 pages).
International Search Report and Written Opinion in related International Application No. PCT/2011/051998 dated Feb. 23, 2012 (7 pages).
Written Opinion of the International Searching Authority in related International Application No. US2006/040266 dated May 15, 2008 (6 pages).
Final Office Action in related U.S. Appl. No. 13/161,267 dated Sep. 10, 2013 (10 pages).
Office Action in related U.S. Appl. No. 13/233,790 dated Aug. 15, 2013 (22 pages).
Office Action in related U.S. Appl. No. 13/233,781 dated Jul. 18, 2013 (23 pages).
Ex parte Quayle Action in related U.S. Appl. No. 13/679,355 mailed Apr. 5, 2013 (8 pages).
Office Action in related U.S. Appl. No. 13/161,267 dated Apr. 4, 2013 (7 pages).
Office Action in related U.S. Appl. No. 13/101,915 dated Dec. 20, 2013 (10 pages).
Final Office Action in related U.S. Appl. No. 14/0254,302 dated Oct. 9, 2014 (10 pages).

* cited by examiner

| Row Identifier | PN sequence | Excitation Transmitter Electrode $[c_n;c_{n-1}]$ | Normalized Deconvolution for Receiver Electrode $[d_n;d_{n-1}]$ | $D*C = g*I_n$ |
|---|---|---|---|---|
| Row 1 | $CDM_4$ | [1 1 1 -1] | [1 1 1 -1] | $4*I_4$ |
| Row 2 | $Barker_{11}$ | [1 1 1 -1 -1 -1 1 -1 -1 1 -1] | [0 0 0 -1 -1 -1 0 -1 -1 0 -1] | $6*I_{11}$ |
| Row 3 | $Barker_{11}$, non-integer multiple | [0.634 0.634 1 -1 -1 -1 0.634 -1 -1 0.634 -1] [0.634 0.634 1 -1 -1 -1 0.634 -1 -1 0.634 -1] | | $8*I_{11}$ |
| Row 4 | $Barker_{13}$ | [1 1 1 1 1 -1 -1 1 1 -1 1 -1 1] | [2/3 2/3 2/3 2/3 2/3 -1 -1 2/3 2/3 -1 2/3 -1 2/3] | $10*I_{13}$ |
| Row 5 | $Barker_{13}$, non-integer multiple | [0.789 0.789 0.789 0.789 0.789 -1 -1 0.789 0.789 -1 0.789 -1 0.789] | [0.789 0.789 0.789 0.789 0.789 -1 -1 0.789 0.789 -1 0.789 -1 0.789] | $9.6*I_{13}$ |
| Row 6 | $Ipatov_{13}$ | [0 0 1 0 1 1 1 -1 0 1 -1 1] | [0 0 1 0 1 1 1 -1 0 1 -1 1] | $9*I_{13}$ |
| Row 7 | $Ipatov_{13}$, non-integer multiple | [-1 0.466 1 0.466 0.936 1 1 -1 -1 0.466 0.936 -1 0.936] | [-1 0.466 1 0.466 0.936 1 1 -1 -1 0.466 0.936 -1 0.936] | $10.3*I_{13}$ |
| Row 8 | $MLS_{15}$ | [1 -1 1 1 1 -1 -1 -1 -1 1 1 1 1 -1] | [1 0 1 1 0 0 1 0 0 0 1 1 1 1 0] | $8*I_{15}$ |
| Row 9 | $MLS_{15}$, non-integer multiple | [1 -2/3 1 1 1 -1 -1 -1 -1 -2/3 -2/3 1 1 1 1 -2/3] | [1 -2/3 1 1 -1 -1 -1 -1 -2/3 -2/3 1 1 1 1 -2/3] | $11.1*I_{15}$ |
| Row 10 | $Legendre17$ | [0 1 1 -1 1 -1 1 1 -1 -1 -1 -1 1 1 -1 1] | matrix not invertible! | |
| Row 11 | $Legendre17$, non-integer multiple | [0.195 1 1 -0.61 1 -0.61 1 1 -0.61 -0.61 -0.61 -0.61 1 1 -0.61 1] | [0.195 1 1 -0.61 1 -0.61 1 1 -0.61 -0.61 -0.61 -0.61 1 1 -0.61 1] | $11*I_{17}$ |

FIG. 3

CAPACITIVE SENSING USING NON-INTEGER EXCITATION

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a capacitive sensing device including a first transmitter electrode, a second transmitter electrode, and multiple receiver electrodes, and a processing system. The processing system is configured to concurrently drive a first transmitter electrode with a first transmitter signal and a second transmitter electrode with a second transmitter signal. The first transmitter signal is based on a first digital code and the second transmitter signal is based on a second digital code. The first digital code and the second digital code each include at least one non-integer multiple. The processing system is further configured to receive multiple resulting signals using multiple receiver electrodes, the resulting signals including effects of the first transmitter signal and the second transmitter signal, and determine positional information based on the resulting signal.

In general, in one aspect, one or more embodiments relate to a method for capacitive sensing that includes concurrently driving a first transmitter electrode with a first transmitter signal and a second transmitter electrode with a second transmitter signal. The first transmitter signal is based on a first digital code and the second transmitter signal is based on a second digital code. The first digital code and the second digital code each include at least one non-integer multiple. The method further includes receiving resulting signals using multiple receiver electrodes, the resulting signals include effects of the first transmitter signal and the second transmitter signal. The method further includes determining positional information based on the resulting signals.

In general, in one aspect, one or more embodiments relate to processing system for capacitive sensing that includes sensor circuitry configured to concurrently drive a first transmitter electrode with a first transmitter signal and a second transmitter electrode with a second transmitter signal. The first transmitter signal is based on a first digital code and the second transmitter signal is based on a second digital code. The first digital code and the second digital code each include at least one non-integer multiple. The sensor circuitry is further configured to receive resulting signals using multiple receiver electrodes. The resulting signals include effects of the first transmitter signal and the second transmitter signal. The processing system further includes processing circuitry configured to determine positional information based on the plurality of resulting signals.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments are directed to driving multiple transmitter electrodes concurrently using digital codes that include non-integer multiples. In one or more embodiments of the invention, the carrier signal is modulated based on the respective digital code. In one or more embodiments of the invention, the non-integer multiple codes are orthogonal, and may exhibit a higher signal to noise ratio.

Figure 1:
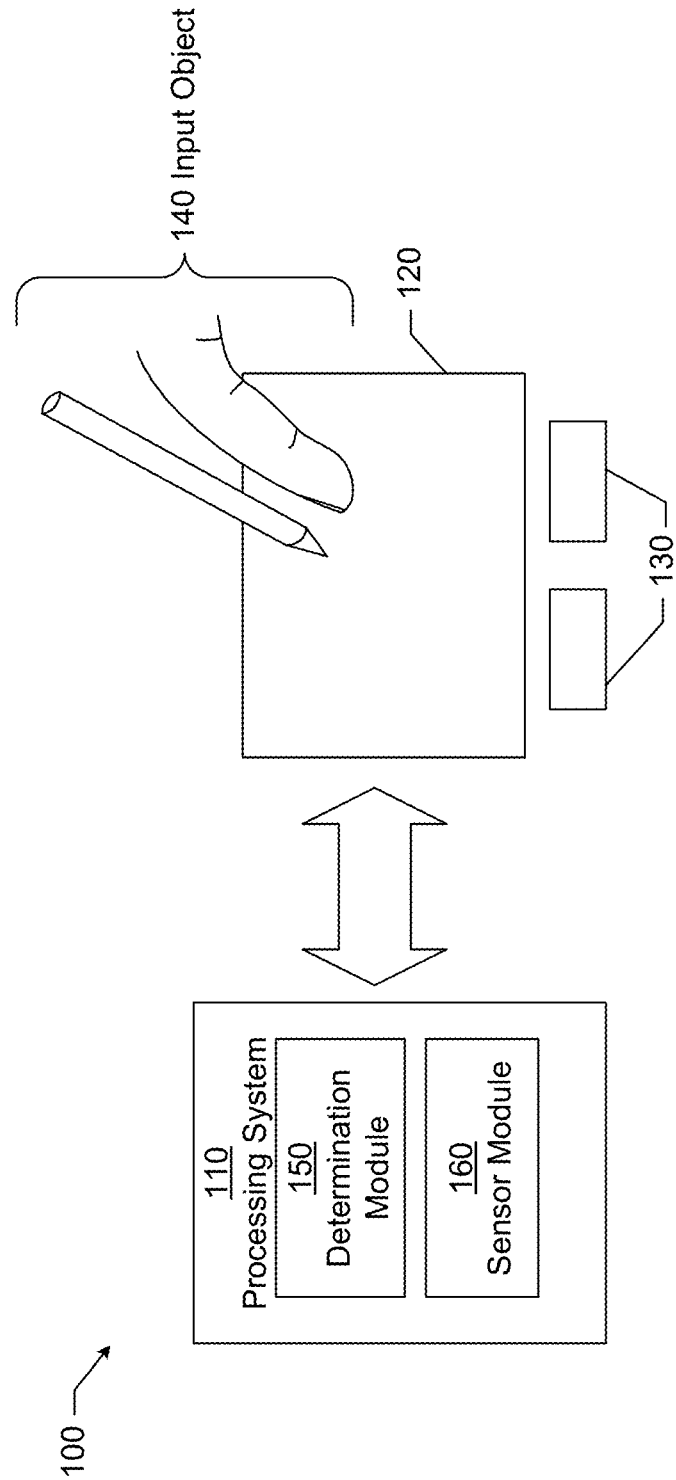
FIGS. 1, 2.1, and 2.2 show schematic diagrams in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the processing system may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1, which may be used together or independently. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratio (SNR) prevents sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes. By way of another example, in some embodiments, transmitter electrodes may be of the same shapes and/or sizes while, in other embodiments, transmitter electrodes may be varying shapes and/or sizes.

In other embodiments, one or more of sensor electrodes are disposed on the same side or surface of the common substrate and are isolated from each other in the sensing region. The sensor electrodes may be disposed in a matrix array where each sensor electrode may be referred to as a matrix sensor electrode. The matrix array may correspond to a grid pattern. Each sensor electrode of sensor electrodes may be substantially similar in size and/or shape. In one embodiment, one or more of the sensor electrodes of the matrix array of sensor electrodes may vary in at least one of the size and shape. Each sensor electrode of the matrix array may correspond to a pixel of a capacitive image (i.e., capacitive pixel). Further, two or more sensor electrodes of the matrix array may correspond to a pixel of a capacitive image (i.e., capacitive pixel). In other words, a capacitive pixel is a location at which a measurement is acquired. In various embodiments, each sensor electrode of the matrix array may be coupled to a separate capacitive routing trace of a plurality of capacitive routing traces. In various embodiments, the sensor electrodes include one or more gird electrodes disposed between at least two sensor electrodes of the sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. Although the sensor electrodes may be electrically isolated on the substrate, the electrodes may be coupled together outside of the sensing region (e.g., in a connection region). In one or more embodiments, a floating electrode may be disposed between the grid electrode and the sensor electrodes. In one particular embodiment, the floating electrode, the grid electrode and the sensor electrode include the entirety of a common electrode of a display device.

In any sensor electrode arrangement (e.g., the matrix array described above), the sensor electrodes may be operated by the input device for mutual capacitive sensing by dividing the sensor electrodes into transmitter and receiver electrodes. As another example, in any sensor electrode arrangement (e.g., the matrix array described above), the sensor electrodes may be operated by the input device for absolute capacitive sensing. As another example, in any sensor electrode arrangement, a mixture of absolute and mutual capacitance sensing may be used. Further, one or more of the sensor electrodes or the display electrodes (e.g., source, gate, or reference (Vcom) electrodes) may be used to perform shielding.

A set of measurements from the capacitive pixels form a capacitive frame. In other words, the capacitive frame represents the set of measurements acquired for a moment in time. The measurements include effects of the capacitance, an input object in the sensing region, and any background capacitance. The capacitive frame may include a capacitive image that is representative of the capacitive couplings at the pixels and/or include a capacitive profile that is representative of the capacitive couplings or along each sensor electrode. Multiple capacitive frames may be acquired over multiple time periods, and differences between them may be used to derive information about input in the sensing region. For example, successive capacitive frames acquired over successive periods of time can be used to track the motion(s) of one or more input objects entering, exiting, and within the sensing region.

The background capacitance of a sensor device is the capacitive frame associated with no input object in the sensing region. The background capacitance changes with the environment and operating conditions, and may be estimated in various ways. For example, some embodiments take "baseline frames" when no input object is determined to be in the sensing region, and use those baseline frames as estimates of their background capacitances. The baseline frame is a capacitive frame obtained using capacitive sensing when an input object is not in the sensing region.

Capacitive frames can be adjusted for the background capacitance of the sensor device for more efficient processing. Some embodiments accomplish this by "baselining" measurements of the capacitive couplings at the capacitive pixels to produce "baselined capacitive frames." That is, some embodiments compare the measurements forming capacitance frames with corresponding "baseline values" of "baseline frames", and determine changes from that baseline image.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include processing circuitry (150) and sensor circuitry (160). The processing circuitry (150) may correspond to hardware circuitry, such as a central processing unit, an application specific integrated circuit, or other hardware. The processing circuitry (150) may include functionality to detect a presence of moisture, operate based on the presence of moisture, determine when at least one input object is in a sensing region, determine SNR, determine positional information of an input object, identify a gesture, determine an action to perform based on the gesture, a combination of gestures or other information, perform other operations, and/or perform any combination of operations.

The sensor circuitry (160) may correspond to hardware circuitry, such as a central processing unit, an application specific integrated circuit, or other hardware that includes functionality to drive the sensor electrodes. For example, the sensor module (160) may include sensory circuitry that is coupled to the sensing elements.

Although FIG. 1 shows the processing circuitry (150) and the sensor circuitry (160) as separate components, all or part of the processing circuitry (150) may be the same as the sensor circuitry (160). Further, although FIG. 1 shows only processing circuitry (150) and sensor circuitry (160), alternative or additional hardware circuitry may exist in accordance with one or more embodiments of the invention. Such alternative or additional circuitry may correspond to distinct circuitry or sub-circuitry than one or more of the circuitry discussed above. Example alternative or additional circuitry includes hardware operation circuitry for operating hardware such as sensor electrodes and display screens, data processing circuitry for processing data such as sensor signals and positional information, reporting circuitry for reporting information, and identification circuitry configured to identify gestures, such as mode changing gestures, and mode changing circuitry for changing operation modes. Further, the various circuitries may be combined in separate integrated circuits. For example, a first circuitry may be comprised at least partially within a first integrated circuit, and a separate circuitry may be comprised at least partially within a second integrated circuit. Further, portions of a single circuitry may span multiple integrated circuits. In some embodiments, the processing system as a whole may perform the operations of the various circuitries.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

In various embodiments, the input device (100) may include one or more sensor electrodes configured for both display updating and input sensing. For example, at least one sensor electrode that is used for input sensing may comprise one or more display electrodes of the display device that are used in updating the display. Further, the display electrode may include one or more of segments of a Vcom electrode (common electrodes), source drive lines (electrodes), gate line (electrodes), an anode sub-pixel electrode or cathode pixel electrode, or any other display element. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the display electrode can also be referred to as a "combination electrode", since it performs multiple functions. In various embodiments, each of the sensor electrodes includes one or more display electrodes associated with a pixel or sub pixel. In other embodiments, at least two sensor electrodes may share at least one display electrode associated with a pixel or sub-pixel.

In various embodiments, a first sensor electrode includes one or more display electrodes configured for display updating and capacitive sensing and a second sensor electrode may be configured for capacitive sensing and not for display updating. The second sensor electrode may be disposed between substrates of the display device or external from the display device. In some embodiments, all of the sensor electrodes may include one or more display electrodes configured for display updating and capacitive sensing.

Processing system (110) may be configured to perform input sensing and display updating during at least partially overlapping periods. For example, a processing system (110) may simultaneously drive a first display electrode for both display updating and input sensing. In another example, processing system (110) may simultaneously drive a first display electrode for display updating and a second display electrode for input sensing. In some embodiments, processing system (110) is configured to perform input sensing and display updating during non-overlapping periods. The non-overlapping periods may be referred to as non-display update periods. The non-display update periods may occur between display line update periods of common display frame and be at least as long as a display line update period. Further, the non-display update periods may occur between display line update periods of a common display frame and be one of longer than or shorter than a display line update period. In some embodiments, the non-display update periods may occur at the beginning of a display frame and/or between display frames. Processing system (110) may be configured to drive one or more of the sensor electrodes and/or the display electrodes with a shield signal. The shield signal may comprise one of a constant voltage signal or a varying voltage signal (guard signal). Further, one or more of the sensor electrodes and/or display electrodes may be electrically floated.

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
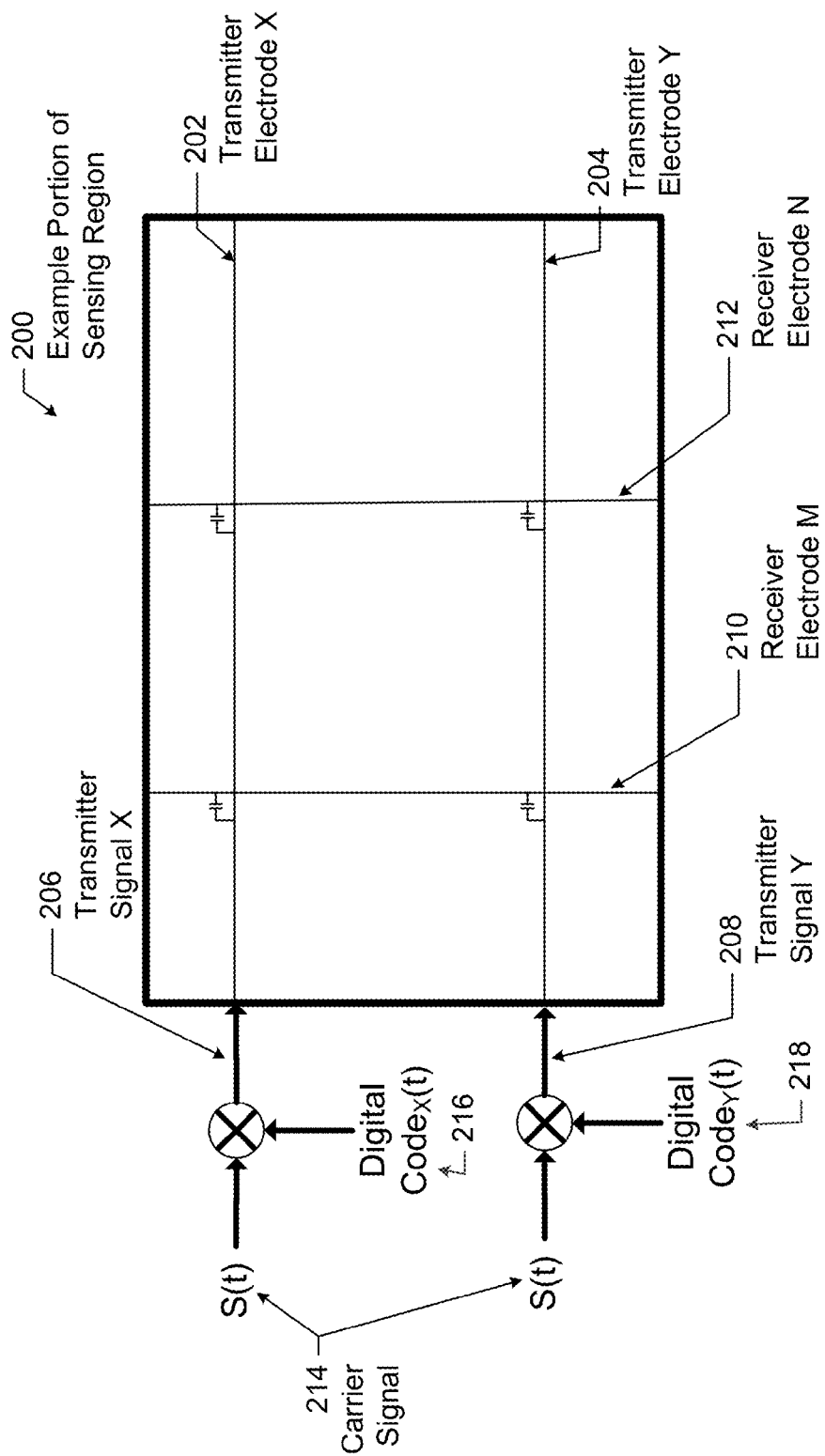

FIG. 2.1 is an example portion of a sensing region (200) in accordance with one or more embodiments of the invention. The example in FIG. 2.1 is for explanatory purposes only and not intended to limit the scope of the invention. For example, the dimensions of the sensing region, dimensions and positioning of electrodes, type sensing region, as well as any other aspects of FIG. 2.1 may change without departing from the scope of the invention. Further, the use of variables in FIG. 2.1 is to distinguish different components of the same or similar type from each other.

In FIG. 2.1, the portion of the sensing region (200) includes transmitter electrode X (202) and transmitter electrode Y (204). Transmitter electrode X (202) and transmitter electrode Y (204) may be driven concurrently with transmitter signals (e.g., transmitter signal X (206), transmitter signal Y (208)). In other words, the transmitter signals are sent at least at partially overlapping times. In some embodiments, the transmitter signals are sent at the same time or substantially the same time. Receiver electrodes (e.g., receiver electrode M (210), receiver electrode N (212)) receive resulting signals that include the effects of the transmitter signals. More particular, the resulting signals include the effects of the transmitter signals, noise, and any change in capacitance at an intersection of the transmitter electrode and the receiver electrode, such as caused by an input object.

In one or more embodiments of the invention, because the transmitter electrodes are driven concurrently, the resulting signal received by a receiver electrode includes effects of both the transmitter signals on the transmitter electrodes. For example, receiver electrode M (210) receives a resulting signal that includes the effects of transmitter signal X (206), transmitter signal Y (208), noise, and any input objects present in the example portion of the sensing region (200).

Continuing with FIG. 2.1, the transmitter signal is generated by modulating a carrier signal (e.g., S(t) (214)) based on a respective digital code (e.g., digital code$_x$(t) (216), digital code$_y$(t) (218)). In the example of FIG. 2.1, "t" refers to time. A carrier signal is a transmitted wave at a steady base frequency of alternation. In one or more embodiments, the frequency and the amplitude of the carrier signal is consistent over time t. For example, the carrier signal may be a square wave, a sine wave, a cosine wave, or other such periodic signal.

The digital code is a code having multiple sequential elements, whereby each sequential element defines a particular modulation (denoted as a circle with an X in FIG. 2.1) of the carrier signal for a corresponding period of time. In other words, each element defines a variation on the carrier signal for the corresponding period of time to create the transmitter signal. The variation may be a pre-emphasis boost, a change in amplitude, a change in phase, a change in frequency, a change in a number of pulses per period time or another change. In one or more embodiments, at least one of the elements of the digital code is a non-integer multiple. A non-integer multiple is a value in the digital code that causes an element in the digital code to exist that is non-integer after any scaling is performed to make the smallest magnitude of an element to be one. In other words, when the digital code is scaled so that the smallest magnitude of an element is one, a non-integer value is in the digital code. The scaling is performed by multiplying each element by the same value. One way to determine whether a digital code includes a non-integer multiple is to scale the digital code by a same value so that the absolute value of at least one element is 1 and the absolute values of any remaining elements are greater than 1. If the resulting digital code (i.e., the digital code that results from performing the scaling) includes a non-integer value, then the digital code includes a non-integer multiple. The digital code may further include elements that are negative multiples, positive multiples, integer multiples, and other values. The sequence of elements defines a sequence of variations of the carrier signal over the span of periods of time.

Each transmitter electrode that transmits concurrently has a corresponding unique digital code for a concurrent transmission of transmitter electrodes. The digital code assigned to a transmitter electrode may change for another concurrent transmission. The digital code assigned to a transmitter electrode may be a circular shift of the digital code assigned to another transmitter electrode. In one or more embodiments of the invention, the digital codes assigned to the transmitter electrodes are orthogonal. By being orthogonal, the digital codes exhibit a higher SNR than non-orthogonal digital codes. SNR may be described by gain 'g', where the gain of 1 corresponds to non-code division multiplexing excitation (i.e., both the convolution matrix C and the deconvolution matric D are simply identity matrix with element of ones diagonally and zeros elsewhere). That is, when the convolution and deconvolution matrices are both an identity matrix, then the transmitter electrodes are not transmitting concurrently, but rather transmitting sequentially. Mathematically, D*C=I*I=I. Using CDM4 as an example, the gain is 4, so SNR is 4 times higher than non-code division multiplexing excitation, or D*C=4I.

Although FIG. 2.1 shows only two transmitter electrodes, the sensing region may have more than two transmitter electrodes. In accordance with one or more embodiments of the invention, the number of transmitter electrodes is greater than or equal to the number of elements in the digital codes. If the number of transmitter electrodes is greater than the number of elements of the digital codes, then the number of transmitter electrodes transmitting concurrently is less than the number of elements of the digital codes.

Although FIG. 2.1 shows a particular diagram of a sensing region in which transmitter electrodes span a length of the sensing region and are orthogonal to the sensing region, other layouts of electrodes may be used. For example, as described above with reference to FIG. 1, sensor electrodes may be arranged in a grid pattern, wherein each node in the grid is a separate electrode. FIG. 2.2 shows an example portion of a sensing region (250) with sensor electrodes (e.g., sensor electrode Q (252), sensor electrode R (254), sensor electrode S (256)) arranged in a grid pattern. In the grid pattern, the sensor electrodes may function as transmitter electrodes and receiver electrodes for different periods of time. For example, during a first time period, sensor electrode Q (252) and sensor electrode S (256) may be transmitter electrodes, and sensor electrode R (254) may be a receiver electrode. During another period of time, sensor electrode R (254) may be a transmitter electrode, and sensor electrode Q (252) and sensor electrode S (256) may be receiver electrodes. In the example, when sensor electrode Q (252) and sensor electrode S (256) are transmitting concurrently, sensor electrode Q (252) and sensor electrode S (256) may each be driven with a transmitter signal that is obtained by modulating a carrier signal using a digital code assigned to the sensor electrode. As described above with reference to FIG. 2.1, the digital code includes at least one non-integer value. Thus, the resulting signal received by the receiver sensor electrode may be demodulated to partition the effects of an input object in different positions of the sensing region.

Further, in one or more embodiments of the invention, the carrier signal frequency may be higher than the rate of the digital code. For example, the frequency of the carrier signal may be higher than the rate at which the digital code modulates the carrier signal. Other embodiments may exist without departing from the scope of the invention.

Figure 3:
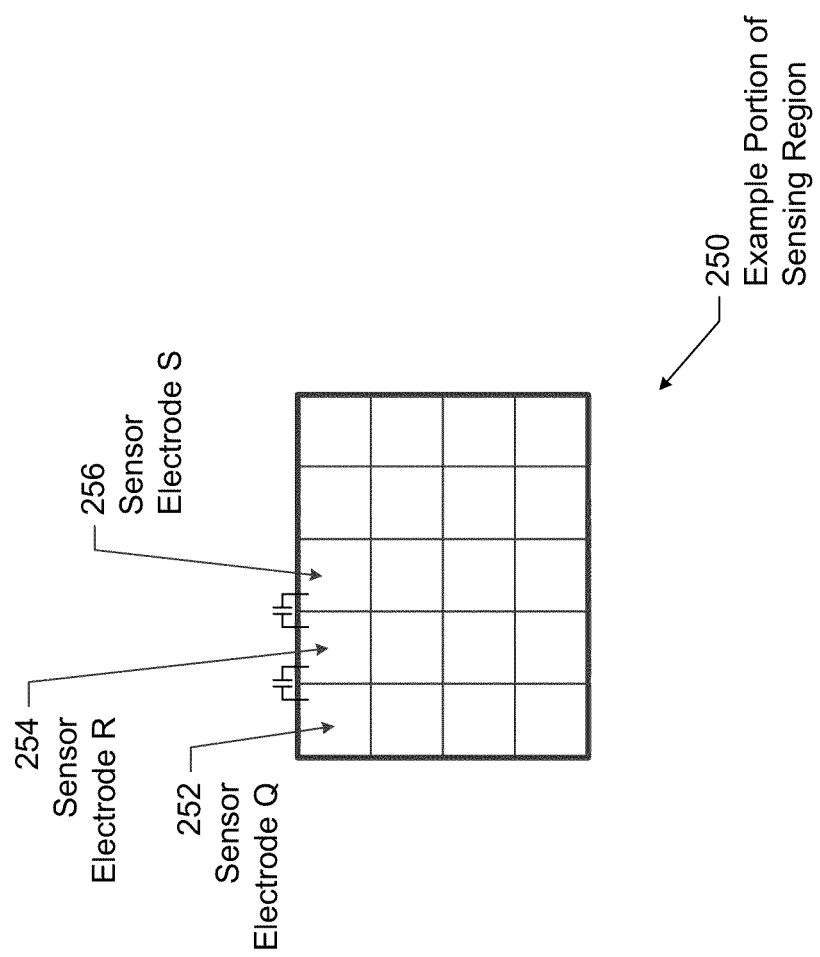
FIG. 3 shows an example in accordance with one or more embodiments of the invention.

FIG. 3 shows a table with example digital codes in accordance with one or more embodiments of the invention. In the example of FIG. 3, the first column (302) is a row identifier, the second column (304) is a name of a pseudo noise sequence that may be used as a digital code, the third column (306) shows the digital code for the corresponding transmitter electrode, the fourth column (308) shows a deconvolution pattern to deconvolve the resulting signal by a receiver electrode, and the fifth column shows the resulting gain.

In the example, the third column (306) shows example digital codes, whereby each digital code includes multiple elements and each element is a number in the digital code. The transmitter signal for the first transmitter electrode is based on a digital code in a particular row as presented in the third column. The transmitter signal for the second transmitter electrode is based on the digital code in the third column and the particular row, but with a circular shift by one. In other words, the second transmitter electrode is driven based on a digital code starting on the second element and ending on the first element. Similar shifting may be performed for the remaining transmitter electrodes that transmit concurrently.

Continuing with the example, the normalized deconvolution column shows how the resulting signal may be deconvolved to identify the transmitter signal being affected by an input object in the sensing region. The deconvolution is performed over the span of time of the transmission signals.

In the example, each row is for a particular pseudo noise sequence. Row 1 (312), row 2 (314), row 4 (318), row 6 (322), row 8 (326), and row 10 (330) show existing pseudo noise sequences. Row 3 (316), row 5 (320), row 7 (324), row 9 (328), and row 11 (332) show the existing pseudo noise sequences modified to include non-integer multiples. For example, as shown in Row 3 (316), the Barker$_{11}$, non-integer multiple, replaces each "1" in standard Barker$_{11}$ (shown in Row 2 (314)) with a "0.634". By using a non-integer multiple, instead of a gain of 6 as with standard Barker$_{11}$, a gain of 8 is achieved as shown in the fifth column (310). Similar consequences of greater gain are achieved using non-integer multiples as compared to the standard counterparts. Further, by using non-integer multiples, the digital codes are orthogonal in accordance with one or more embodiments of the invention. The fact that the digital codes are orthogonal means that the resulting signal has optimal signal to noise ratio. In other words, the resulting signal has less artifacts of noise and includes greater effects of any input objects in the sensing region.

Additionally, in the example of Lengedre17 in Row 10 (330), because Lengedre17 is not invertible, Lengedre17 may not be used as a digital code. In other words, deconvolution of the resulting signal may not be performed. However, the non-integer multiple version in Row 11 is invertible. Thus, the non-integer multiple provides a digital code that may be used to concurrently drive 17 transmitter electrodes. By being able to concurrently drive 17 transmitter electrodes, the same transmitter electrode may obtain more measurements of the sensing region may be acquired over the same time period as using time slicing in accordance with one or more embodiments of the invention. In other words, more time may be allocated to each transmitter electrode to obtain measurements because the time may overlap with 16 other transmitter electrodes. The additional measurements may be achieved by increasing the number of pulses and obtaining more resulting signals. In one or more embodiments of the invention, concurrently driving 17 transmitter electrodes may allow for less time to perform a frame of sensing. In other words, more sensing frames may be obtained for the same time period. Thus, the input device may be more responsive to the existence and movement of input objects in the sensing region.

Figure 4:
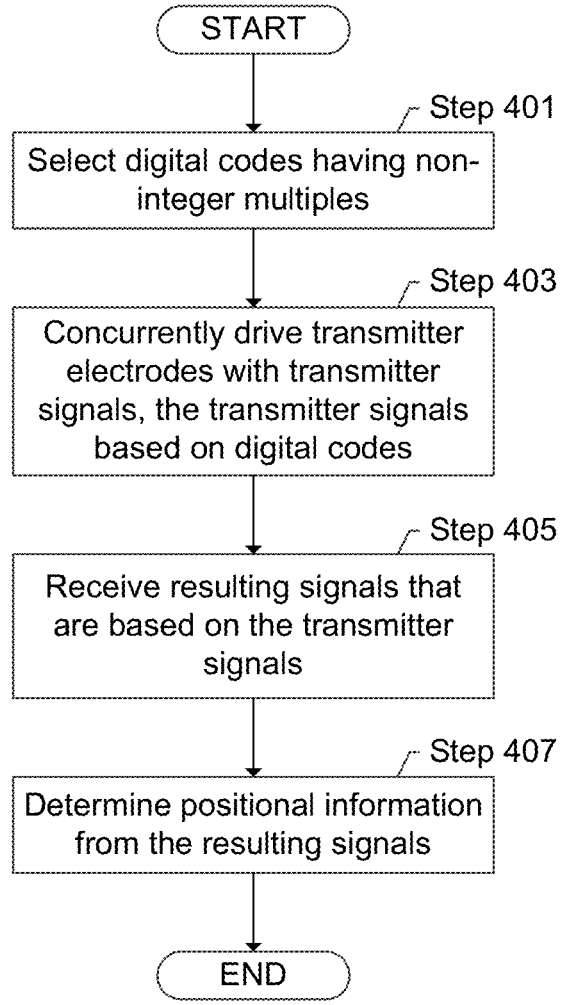
FIG. 4 shows a flowchart in accordance with one or more embodiments of the invention.

FIG. 4 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 401, digital codes having at least one non-integer multiple are selected in accordance with one or more embodiments of the invention. In one or more embodiments of the invention, the digital codes are selected based on the number of transmitter electrodes to be concurrently transmitting. The number of elements in the digital code is at least the same as the number of transmitter electrodes. Further, in accordance with one or more embodiments of the invention, the amount of gain and efficiency of digital code may be used as a factor in selecting digital codes.

In Step 403, the transmitter electrodes are driven concurrently with transmitter signals, the transmitter signals based on the digital codes having the non-integer multiples. In one or more embodiments, a carrier signal for a transmitter electrode is modulated using the elements of the digital code. In other words, each element in the digital code assigned to the transmitter electrode modulates the carrier signal in sequential order of the digital code. The modulation may be to multiply the amplitude of the carrier signal by the amount of the current element in the digital code. By way of another example, the voltage of the carrier signal may be changed according the digital code. In other words, where a non-integer multiple is the current element, the voltage of the transmitter signal may be a fraction of the voltage of the carrier signal. By way of another example, the number of pulses of the carrier signal may be changed based on the current element in the digital code. Specifically, for each element, the number of pulses for the time period allocated to the element is changed based on the element. In the example, for Barker$_{11}$, the first three transmitter electrodes may be driven with 634 pulses in positive polarities and the next three transmitter electrodes may be driven with 1000 pulses in negative polarities. By way of another example, pre-emphasis boost may be used to modulate the carrier signal. In other words, for an initial phase of the signal, the carrier signal is excited at a higher level. For a later phase, the signal drops to a lower level. The length of time and/or the magnitude of the higher level and the lower level is defined such the average is a function of the current element in the digital code.

As discussed above, each element in the digital code is allocated a time period according to the order in the digital code. When each element in the digital code is processed, the driving of the transmitter electrodes may be complete. In some embodiments, the next set of transmitter electrodes that transmit concurrently is processed.

As the transmitter electrodes are driven, resulting signals that are based on the transmitter signals are received in Step 405. The resulting signals include effects of the transmitter signals, noise, and any input object in the sensing region. For example, for a particular transmitter electrode, the transmitter signal is affected by the capacitive coupling between the transmitter electrode and the receiver electrode as well as the capacitive changes caused by the presence of an input object where the transmitter electrode is capacitively coupled to the receiver electrode. The foregoing result is further combined with the results of each transmitter signals of transmitter electrodes that are capacitively coupled to the same receiver electrode. Thus, if an input object is present, the resulting signals is an amalgamation of the transmitter signals including at least one transmitter signal being affected by the presence of the input object. The resulting signals may span the time periods in which the elements of the digital codes are processed.

In Step 407, positional information is determined from the resulting signals in accordance with one or more embodiments of the invention. Measurements of the resulting signals are obtained. Deconvolution is performed on the measurements to obtain measurements corresponding to each transmitter electrode that transmitted concurrently. By way of an example, if the convolution matrix is Cn, the deconvolution matrix Dn is simply an inverse of Cn (i.e., $Dn=Cn^{-1}$). If the matrix of Cn is circulant (e.g., the digital codes assigned to the transmitter electrodes are circular shifted) and is also orthogonal, then the rows of Cn is equal to the columns of Dn. Thus, Dn is the transpose of Cn (i.e., $Dn=Cn^{T}$).

From the measurements, a baseline of the sensing region that removes the presence of noise may be subtracted. The results may be combined into a capacitive image of the sensing region, which has peak measurement values at locations in which the input object is present. The locations of the input objects, size, shape, and other information may be obtained from the capacitive image as positional information. The positional information may be reported to a host device, and used to perform a user interface or other action.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A capacitive sensing device comprising:
    a first transmitter electrode, a second transmitter electrode, and a plurality of receiver electrodes; and
    a processing system configured to:
        concurrently drive the first transmitter electrode with a first transmitter signal and the second transmitter electrode with a second transmitter signal,
            wherein the first transmitter signal is based on a first digital code and the second transmitter signal is based on a second digital code,
            wherein the first digital code and the second digital code each comprise at least one non-integer multiple, and
            wherein concurrently driving the first transmitter electrode and the second transmitter electrode comprises performing pre-emphasis based on the at least one non-integer multiple in the first digital code and the second digital code,
        receive a plurality of resulting signals using a plurality of receiver electrodes, the plurality of resulting signals comprising effects of the first transmitter signal and the second transmitter signal, and
        determine positional information based on the plurality of resulting signals.

2. The capacitive sensing device of claim 1, wherein the first digital code and the second digital code are orthogonal.

3. The capacitive sensing device of claim 1, wherein the first digital code comprises a negative value, the negative value reflected in the polarity of the first transmitter signal.

4. The capacitive sensing device of claim 1, wherein the first digital code is a circular shift of the second digital code.

5. The capacitive sensing device of claim 1, wherein the first digital code comprises a plurality of elements, each element of the plurality of elements defining a voltage that is used to drive the first transmitter electrode.

6. The capacitive sensing device of claim 1, wherein the first digital code comprises a plurality of elements, each element of the plurality of elements defining a number of pulses at each period of time when driving the first transmitter electrode.

7. The capacitive sensing device of claim 1, wherein the first digital code further comprises at least one selected from a group consisting of a negative multiple and an integer multiple.

8. The capacitive sensing device of claim 1, wherein the first digital code comprises at least one selected from the group consisting of:
    [0.634 0.634 0.634 −1 −1 −1 0.634 −1 −1 0.634 −1],
    [0.789 0.789 0.789 0.789 0.789 −1 −1 0.789 0.789 −1 0.789 −1 0.789],
    [−1 0.466 1 0.466 0.936 1 1 −1 −1 0.466 0.936 −1 0.936],
    [1 −2/3 1 1 −2/3 −2/3 1 −2/3 −2/3 −2/3 1 1 1 1 −2/3], and
    [0.195 1 1 −0.61 1 −0.61 −0.61 −0.61 1 1 −0.61 −0.61 −0.61 1 −0.61 1 1].

9. The capacitive sensing device of claim 1, wherein the first transmitter signal is based on the first digital code comprises modulating a carrier signal based on the first digital code and the second transmitter signal is based on the second digital code comprises modulating the carrier signal based on the second digital code.

10. The capacitive sensing device of claim 9, wherein the carrier signal comprises a varying voltage.

11. A method for capacitive sensing comprising:
    concurrently driving a first transmitter electrode with a first transmitter signal and a second transmitter electrode with a second transmitter signal,
        wherein the first transmitter signal is based on a first digital code and the second transmitter signal is based on a second digital code,
        wherein the first digital code and the second digital code each comprise at least one non-integer multiple, and
        wherein concurrently driving the first transmitter electrode and the second transmitter electrode comprises performing pre-emphasis based on the at least one non-integer multiple in the first digital code and the second digital code;
    receiving a plurality of resulting signals using a plurality of receiver electrodes, the plurality of resulting signals comprising effects of the first transmitter signal and the second transmitter signal; and
    determining positional information based on the plurality of resulting signals.

12. The method of claim 11, wherein the first digital code comprises a plurality of elements, each element of the plurality of elements defining a voltage that is used to drive the first transmitter electrode.

13. The method of claim 11, wherein the first digital code comprises a plurality of elements, each element of the plurality of elements defining a number of pulses at each period of time when driving the first transmitter electrode.

14. The method of claim 11, wherein the first digital code further comprises at least one selected from a group consisting of a negative multiple and an integer multiple.

15. The method of claim 11, wherein the first transmitter signal is based on the first digital code comprises modulating a carrier signal based on the first digital code and the second transmitter signal is based on the second digital code comprises modulating the carrier signal based on the second digital code.

16. A processing system for capacitive sensing comprising:
sensor circuitry configured to:
concurrently drive a first transmitter electrode with a first transmitter signal and a second transmitter electrode with a second transmitter signal,
wherein the first transmitter signal is based on a first digital code and the second transmitter signal is based on a second digital code,
wherein the first digital code and the second digital code each comprise at least one non-integer multiple, and
wherein concurrently driving the first transmitter electrode and the second transmitter electrode comprises performing pre-emphasis based on the at least one non-integer multiple in the first digital code and the second digital code, and
receive a plurality of resulting signals using a plurality of receiver electrodes, the plurality of resulting signals comprising effects of the first transmitter signal and the second transmitter signal; and
processing circuitry configured to:
determine positional information based on the plurality of resulting signals.

17. The processing system of claim 16, wherein the first digital code comprises a plurality of elements, each element of the plurality of elements defining a voltage that is used to drive the first transmitter electrode.

18. The processing system of claim 16, wherein the first digital code comprises a plurality of elements, each element of the plurality of elements defining a number of pulses at each period of time when driving the first transmitter electrode.

* * * * *